United States Patent [19]

Sigwarth et al.

[11] 4,008,917
[45] Feb. 22, 1977

[54] SEAT SAFETY BAR

[75] Inventors: Herbert Francis Sigwarth, Sherrill; Richard Lukens Cade, Dubuque, both of Iowa

[73] Assignee: Deere & Company, Moline, Ill.

[22] Filed: May 10, 1976

[21] Appl. No.: 685,016

Related U.S. Application Data

[63] Continuation of Ser. No. 539,794, Jan. 9, 1975, abandoned.

[52] U.S. Cl. .............................. 296/65 A; 248/429; 297/216
[51] Int. Cl.² .................. B60N 21/00; B60R 21/00
[58] Field of Search .............. 296/65 AR; 248/424, 248/429, 430; 297/216

[56] References Cited

UNITED STATES PATENTS

| 2,420,728 | 5/1947 | Ulrich | 248/429 |
| 3,578,376 | 5/1971 | Hasegawa | 296/65 A |

FOREIGN PATENTS OR APPLICATIONS

| 1,137,518 | 1/1957 | France | 296/65 R |
| 809,026 | 5/1951 | Germany | 296/65 R |

*Primary Examiner*—Philip Goodman

[57] ABSTRACT

A seat structure includes a seat cushion supporting frame connected to a platform by suspension linkage permitting vertical movement of the seat relative to the platform, the platform in turn being connected to a base through means of guide track and latch means for permitting selected fore-and-aft adjustment of the platform relative to the base member. A U-shaped safety bar is disposed such that opposite vertical legs thereof extend upwardly through fore-and-aft extending openings in a horizontal plate member of the platform, the upper ends of the legs of the safety bar being fixed to the platform so that the safety bar is carried therewith during fore-and-aft adjustment of the platform.

3 Claims, 3 Drawing Figures

SEAT SAFETY BAR

CROSS REFERENCE TO RELATED APPLICATION

This is a continuation of U.S. Pat. application Ser. No. 539,794 filed 9 Jan. 1975, now abandoned.

BACKGROUND OF THE INVENTION

The present invention relates to a safety device for use in conjunction with a vehicle seat assembly and more particularly relates to a safety device for limiting the possibility that the seat cushion supporting structure of the assembly will become separated from the fixed base portion of the assembly during upset or collision of the vehicle.

The seat cushion supporting structure of a seat assembly is often suspended for vertical movement and is mounted for fore-and-aft adjustment relative to a base member. Heretofore, it has been the practice to use flexible belts or chains or the like to tether the seat cushion supporting portion of the seat structure to the vehicle floor so as to prevent the seat cushion supporting structure from moving freely about in a vehicle cab in the event that the seat cushion supporting structure becomes separated from the base as might happen due to failure of connecting means mounting the seat cushion supporting structure from the base for fore-and-aft movement relative thereto. These tether belts or chains are not entirely satisfactory since they must be of sufficient length to permit the seat cushion supporting portion to move vertically and fore and aft during normal operation of the seat. Also, in order to be disposed at the most effective angle for preventing forward movement of the seat cushion supporting structure beyond that which is desired, these belts and chains are disposed at an angle which requires them to be fastened to the floor behind the seat thus resulting in the belts occupying space which might otherwise be available for other uses.

SUMMARY OF THE INVENTION

According to the present invention, there is provided a novel seat assembly of the type including a seat cushion supporting framework which is vertically translatable and shiftable fore and aft relative to a base member, the assembly embodying a safety device for reducing the possibility that the cushion supporting framework will become separated from the base member during collision or upset of the vehicle in which the seat assembly is embodied.

It is an object of the invention to provide a safety device in conjunction with a seat assembly as described in the preceding paragraph wherein the safety device is compact and is mounted completely within the confines of the seat assembly.

A more specific object is to provide a safety device which is in the form of a rigid U-shaped rod mounted such that opposite legs thereof project upwardly through a pair of parallel fore-and-aft extending lost motion apertures provided in a horizontal plate portion of the base member, the upper ends of the legs being secured to a platform which is mounted for fore-and-aft movement relative to the base member and has the seat cushion supporting frame connected thereto.

These and other objects will become apparent from a reading of the following description in conjunction with the appended drawing.

DESCRIPTION OF THE PREFERRED EMBODIMENT

Figure 2:
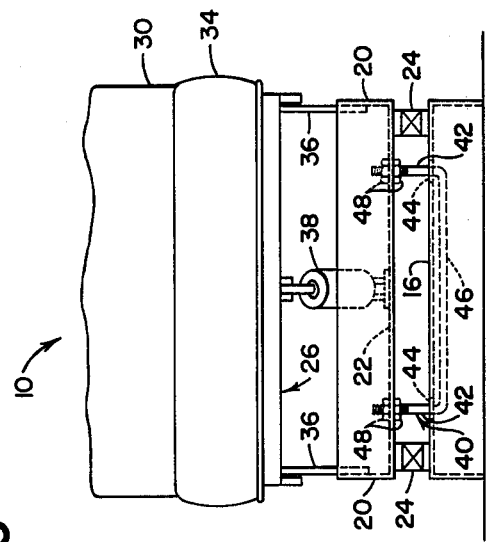
FIG. 2 is a front view of the seat assembly shown in FIG. 1.
Figure 3:
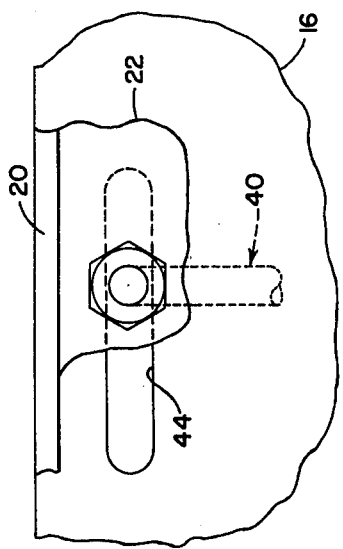
FIG. 3 is a top plan view showing the manner by which the safety rod interconnects the platform with the base member.
Figure 1:
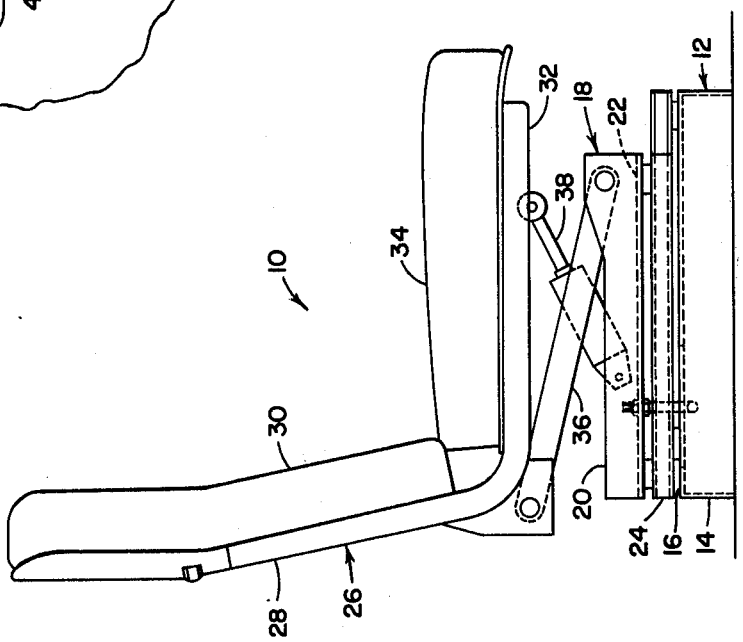
FIG. 1 is a right side elevational view of a somewhat schematically shown seat assembly embodying the safety device of the present invention.

Referring now to the drawing, therein is shown a seat assembly indicated in its entirety by the reference numeral 10. The seat assembly 10 is typical of the type with which the safety device of the present invention is particularly adapted for use and includes a base member 12 here shown as an inverted box which would normally be rigidly secured by conventional means (not shown) to the floor of a cab of a vehicle embodying the seat structure 10. Connecting vertical side walls 14 of the base member 12 is a horizontal wall 16. A platform 18 is disposed vertically above the base member 12 and includes vertical sides 20 which are interconnected by a horizontal wall 22. The platform 18 is connected to the base member 12 for selected fore-and-aft movement relative thereto through means of a pair of fore-and-aft extending parallel slide rail connections shown schematically at 24 between the horizontal walls 16 and 22 respectively of the base member 12 and platform 18. Spaced vertically above the platform 18 is a support frame 26 which is L-shaped in side view and thus defines a back portion 28 to which a backrest 30 is secured and a bottom 32 to which a seat portion 34 is secured. The support frame 26 is suspended from the platform 18 through means of a pair of parallel links 36 connected between the frame 26 and the vertical sides 20 of the platform 18 and a shock absorber 38 located centrally between the links 36 and having one end pivotally connected to the frame 26 and having its other end pivotally connected to the horizontal wall 22 of the platform 18. The parallel links 36 and shock absorber 38 thus suspend the support frame 26 to the platform 18 for vertical movement relative to the platform 18.

The present invention comprises a safety device defined by a U-shaped safety bar or rod 40 having opposite legs 42 projecting upwardly through parallel fore-and-aft guide openings 44 provided in the horizontal wall 16 of the base member 12 just inboard of the slide rail connections 24. Joining the legs 42 of the safety bar 40 is a connecting portion 46 which underlies the wall 16. The upper ends of the legs 46 are threaded and extend through apertures provided in the horizontal wall 22 of the platform 18 and are each held in place by pairs of nuts 48.

In operation, it will be appreciated that the safety bar 40 will move together with the platform 18 when the latter, together with the support frame 26, are selectively adjusted fore-and-aft as permitted by the slide rail connections 24. If the vehicle embodying the seat assembly 10 is involved in an accident involving a collision or rollover, the safety bar 40 will prevent fore-and-aft movement of the support frame 26 beyond that which brings the safety bar 40 into engagement with the front and rear ends of the openings 44. Further, it will be appreciated that the support frame 26 will be prevented from moving vertically away from the base member 12 by a distance more than that permitted by the suspension linkage defined by the parallel links 36 and shock absorber 38 since the connecting portion 46 of the safety bar 40 will engage the under side of the platform wall 22 after only a small vertical movement of the platform 18 relative to the base member 12.

It will thus be appreciated that the safety bar 40 provides an effective means for preventing separation of the platform 18 from the base member 12 and that the safety bar 40 is disposed within the confines of the seat structure 10 so as not to occupy space which may be used for other purposes.

We claim:

1. In combination with a seat assembly including a base member, a platform, connecting means mounting the platform on the base for fore-and-aft movement between front and rear extreme positions relative to the base member and a seat cushion secured to the platform, a safety device for preventing separation of the platform from the base member in the event of failure of the connecting means, comprising; said base member including a pair of parallel transversely spaced fore-and-aft extending guide slots; an elongate single rigid member having opposite end portions respectively received in the pair of guide slots and secured to said platform.

2. The combination defined in claim 1 wherein said base member includes a horizontal plate portion; and said pair of guide slots being located in the horizontal plate portion.

3. The combination defined in claim 2 wherein said rigid member is a generally U-shaped rod having opposite legs respectively received in the pair of guide slots and having a portion connecting the legs and underlying the plate portion; and said legs being connected to the platform.

* * * * *